United States Patent [19]
Grady et al.

[11] 3,729,981
[45] May 1, 1973

[54] APPARATUS FOR DETERMINING VISUAL PHASE EQUILIBRIA DATA

[75] Inventors: Guido O. Grady, Tulsa; Everett L. Swalley, Barnsdall; Sam C. Swift, Tulsa, all of Okla.

[73] Assignee: Cities Service Oil Company, Tulsa, Okla.

[22] Filed: Sept. 17, 1971

[21] Appl. No.: 181,501

[52] U.S. Cl. .............................................. 73/17 A
[51] Int. Cl. .............................................. G01n 25/02
[58] Field of Search .............................. 73/17, 19

[56] References Cited

UNITED STATES PATENTS

| | | | |
|---|---|---|---|
| 2,380,081 | 7/1945 | Sloan | 73/23 |
| 2,791,901 | 5/1957 | Rich | 73/17 |
| 2,966,055 | 12/1960 | Tracht et al. | 73/17 |
| 2,662,393 | 12/1953 | Rzasa | 73/17 X |
| 3,245,249 | 4/1966 | Berhenke et al. | 73/17 |

*Primary Examiner*—Herbert Goldstein
*Attorney*—J. Richard Geaman

[57] ABSTRACT

Apparatus is disclosed comprising a capillary tube having piston means contained therein such that the tube may be loaded with a sample system for visual phase equilibria study. Pressure is equalized within and without the capillary tube through movement of the piston for changing volumes required while the temperature remains constant throughout the system.

1 Claim, 1 Drawing Figure

Patented May 1, 1973 3,729,981
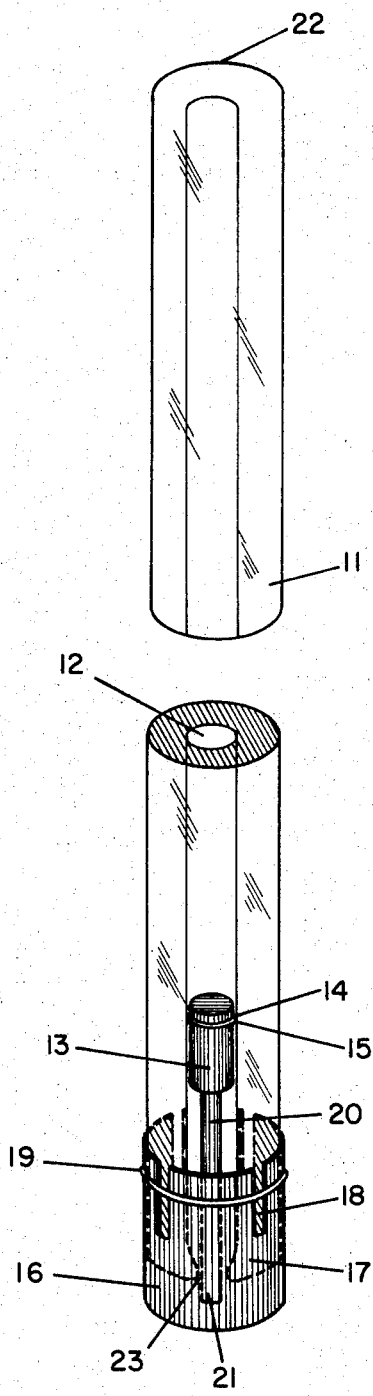

APPARATUS FOR DETERMINING VISUAL PHASE EQUILIBRIA DATA

BACKGROUND OF THE INVENTION

The present invention relates to apparatus for visual phase equilibria studies. More particularly, the apparatus of the present invention comprises means for equalizing the pressure within and without a capillary tube in order to gain versatility in a visual equilibria cell.

Conventional apparatus for phase equilibria study generally comprises constant volume autoclaves in which the temperature and pressure may be varied through external means and sampling must be conducted of the phases contained therein in order to determine the stoichiometry of the system. Visual capillary cells may also be utilized for phase equilibria studies in which a constant volume sample is placed within a constant volume system. The temperature is varied therein the system in order to determine the specifics of the phase equilibria of the system for one concentration and pressure. The inherent difficulty in both systems is their limited flexibility and the requirement of numerous loadings of autoclave or sample capillary tubes in order to determine the phase equilibria of the system being studied. Tremendous equipment is generally required involving tedious analytical procedures with a relatively slow obtainment of equilibria data.

What is required is a method which is both flexible and allows for an economic determination of the phase equilibrium system through visual means, utilizing standard apparatus in which temperature and pressure is controlled.

It is an object of the present invention to provide apparatus for the determination of visual phase equilibria.

It is a further object of the present invention to provide means for controlling the pressure and temperature within a phase equilibria capillary system.

It is still a further object of the present invention to provide apparatus wherein pressure may be equalized within and without a capillary cell through means for changing the volume of the capillary cell.

With these and other objects in mind the present invention may be more fully understood through the following discussion and the accompanying drawing.

SUMMARY OF THE INVENTION

The objects of the present invention are accomplished through apparatus for phase equilibria studies which comprises a capillary tube, one end of which is sealed, and a slideable piston axially aligned within the capillary tube in combination with means for sealing the piston within the capillary tube to prevent the egress of fluids contained within the capillary tube between the sealed end thereof and the piston. The means for sealing the piston may comprise an O-ring mounted within a recess milled upon the circumferential surface of the piston. The apparatus may further comprise a loading cup positioned so as to receive the open end of the capillary tube, retaining the capillary tube in a vertical position, and having a plunger arm centrally positioned within and affixed to the loading cup. The outside diameter of the plunger arm is less than the inside diameter of the capillary tube so that the plunger arm extends within the capillary tube and causes the piston to rest on its end when the apparatus is not under pressure. The loading cup may further have one or more slots machined in its sides with the apparatus further comprising a retaining ring positioned about the sides of the loading cup to hold the capillary tube rigidly in position.

BRIEF DESCRIPTION OF THE DRAWING

The present invention may be more fully understood by referral to the accompanying drawing in which a preferred embodiment of the apparatus of the present invention is depicted.

DETAILED DESCRIPTION OF THE INVENTION

The present invention is most easily depicted by referral to the accompanying FIGURE in which a quartz capillary tube 11, having longitudinal aperture bore 12 contained therein, is sealed at one end 22 so as to provide a capillary cell for phase equilibria studies. The capillary tube 11 has a piston 13 contained therein having an outside diameter less than inside diameter of the aperture bore 12 of capillary tube 11. The piston 13 has a recess 14 reamed thereon its circumferential surface so as to be capable of receiving O-ring 15, which provides a means for sealing piston 13 within the aperture bore 12 of the capillary tube 11. When the capillary cell is not under pressure, piston 13 may rest upon a plunger arm 20 centrally affixed to a loading cup 16 at its lower end 21 so as to provide a rest for the piston 13 and a lower limit of movement for the piston 13. The loading cup 16 is machined so as to receive the outer diameter of the capillary tube 11 therein with the plunger arm 20 slideably mounted within the aperture 12 of the capillary tube 11 while providing clearance space 23 between the bottom of the capillary tube 17 and the plunger arm 20. The clearance space 23 is provided between the lower portion of the capillary tube 17 and the plunger arm 20 so as to yield a means for introducing a fluid under pressure, not depicted in the accompanying FIGURE, such that the pressuring fluid may be introduced to force the piston 13 upwardly against the system components contained within the aperture bore 12 of capillary tube 11. The loading cup 16 may have one or more slots 18 contained within the sides of the loading cup 16 in order to lend flexibility thereto with the apparatus further comprising a retaining ring 19 placed about the sides of the loading cup 16, over the machined slots 18, after the capillary tube 11 is introduced therein so as to provide a means for firmly mounting the capillary tube 11 in a vertical position to form the visual phase equilibria cell.

As disclosed, the apparatus of the present invention may generally comprise a quartz capillary tube having a piston contained within the aperture bore thereof such that the tube may be loaded with a sample of the system, for example a sulfur-hydrocarbon system, placed within a visual equilibria cell, for example a windowed autoclave, so as to provide safety means, and having the pressure and temperature varied thereon. The pressure is equalized within and without the capillary tube through movement of the piston for changing volumes with the temperature therein being constant throughout the system. Therefore, from one component system loading of the quartz capillary tube, a researcher may determine the entire phase equilibria of that component system for varying pressures and temperatures through varying the conditions placed upon the quartz capillary tube and piston contained within the windowed equilibria cell. As an example of usage and preferred piston design utilized, a capillary tubing having an inside diameter of 3/32 of an inch may be utilized with a piston having an outside diameter of 5/64 of an inch. A recess is machined therein the piston having an outside diameter of 1/32 of an inch with an O-ring, having an outside diameter of 3/32 of an inch and an inside diameter of 1/32 of an inch, placed therein the recess. The capillary tube is loaded upon the plunger arm of a loading cup with the piston resting thereon with the entire assembly being placed within a windowed equilibrium cell. Generally, the windowed equilibrium cell is pressured with oil or some other liquid for easy loading on the system under safe conditions and visual determination of the phase equilibria occurring within the system. Standard techniques for determining bubble and dew point curves may be utilized for determination of the phase equilibria of the system.

Therefore, the apparatus of the present invention provides means for visually determining the phase equilibria of systems under varying pressure loads through utilization of a capillary cell. The apparatus circumvents the inherent problems of previous researchers in not requiring stoichiometric changes to be made in order to determine the phase equilibria of systems. Visual determinations may be made through the use of standard equipment in conjunction with the apparatus disclosed herein.

While the invention has been described above with respect to certain embodiments thereof, it will be understood by those skilled in the art that various changes and modifications may be made without departing from the spirit and scope of the invention as set forth herein.

Therefore, we claim:

1. Apparatus for phase equilibria studies which comprises:
   a. a capillary tube having one end thereof sealed;
   b. a slideable piston axially aligned within the capillary tube wherein the piston has a recess milled within its circumferential surface;
   c. an O-ring mounted within the recess of the piston and snuggly engaging the internal side of the capillary tube;
   d. a loading cup positioned so as to receive the open end of the capillary tube and retain the capillary tube in a vertical position and further including one or more slots machined therein and having a retaining ring positioned about the sides to hold the capillary tube rigidly in place; and
   e. a plunger arm connected to the piston and centrally positioned within and affixed to the loading cup and including an outside diameter less than the inside diameter of the capillary tube and extending within the capillary tube so that the piston may rest thereon when the apparatus is not under pressure.

* * * * *